No. 860,730. PATENTED JULY 23, 1907.
J. M. CORNELL.
OVERHANGING DEVICE FOR CENTRIFUGAL MACHINES.
APPLICATION FILED NOV. 27, 1906.

Witnesses
C. H. Walker.
Wm. Ers Samt.

Inventor
John M. Cornell
By
Attorney

UNITED STATES PATENT OFFICE.

JOHN M. CORNELL, OF PHILLIPSTOWN, NEW YORK.

OVERHANGING DEVICE FOR CENTRIFUGAL MACHINES.

No. 860,730.　　　　　Specification of Letters Patent.　　　Patented July 23, 1907.

Application filed November 27, 1906. Serial No. 345,412.

*To all whom it may concern:*

Be it known that I, JOHN M. CORNELL, a citizen of the United States of America, and a resident of the town of Phillipstown, Putnam county, in the State of New York, have invented a new and useful Improvement in Overhanging Devices for Centrifugal Machines, of which the following is a specification.

This invention relates to improved hangings for the baskets of overhung centrifugal machines, and consists in certain novel combinations of parts hereinafter described and claimed.

The objects of the invention are to avoid the employment of a bottom bearing for the upright shaft, and at the same time to compel or "induce" the basket to run true when unevenly loaded, by a novel and superior mechanical device.

A sheet of drawings accompanies this specification as part thereof.

Figure 1:
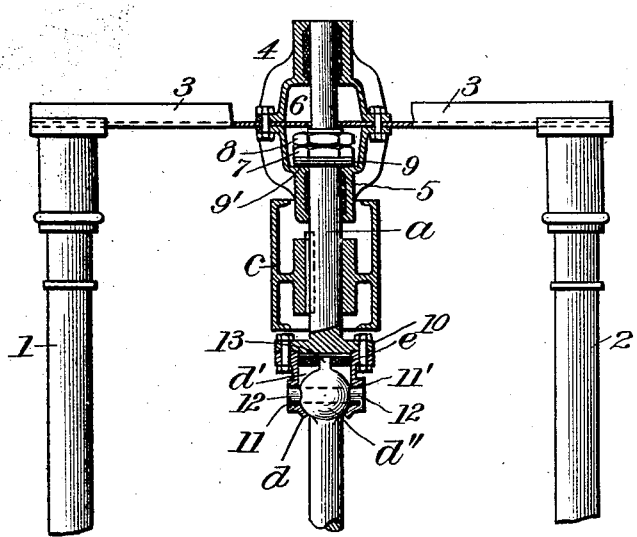
Figure 2:
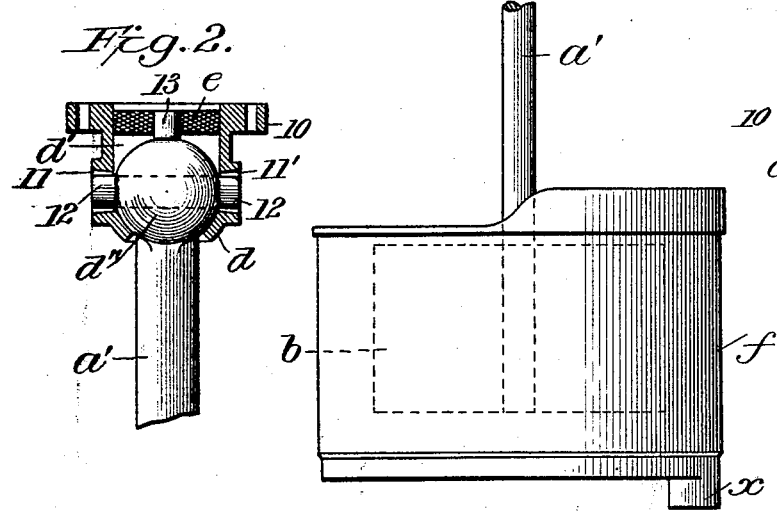
Figure 3:
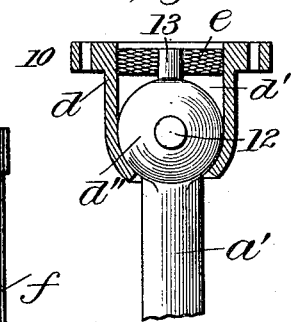

Figure 1 is a fragmentary sectional-elevation of a centrifugal machine constructed with the improved hanging device; Fig. 2 represents an enlargement of a portion of the same view, and Fig. 3 represents a sectional elevation projected at right angles from Fig. 2.

Like reference characters refer to like parts in all the figures.

As shown in the drawings, a pair of side frames, 1 and 2, carry at their upper ends a horizontal support, 3, for the basket, *b*, shown in dotted lines in Fig. 1, and its hangings, and the latter include a pair of rigid bearings, 4 and 5, bolted respectively to the top and bottom of said support and recessed to form between the bearings proper a space, 6, within which the upper section, *a*, of the upright shaft, is provided with a pair of nuts, 7 and 8, beneath which washers, 9, of steel, indurated fiber or other suitable material, contact with the floor of said space which is adapted to form a seat, 9', for the same.

Beneath the lower rigid bearing 5, a combined pulley and oil catcher, *c*, is keyed fast upon said upper shaft section *a* and beneath said combined pulley and oil catcher the said upper shaft section terminates in a coupling disk, 10. A socket piece, *d*, flanged to match said coupling disk 10 is bolted rigidly to its bottom, and is constructed with a ball-socket, *d'*, and with diametrically opposite flaring holes, 11 and 11', to interact with the respective ends of a steel pin, 12, upon which the inclosed ball *d''* is forged, cast, shrunk or otherwise appropriately secured, the function of said pin being to keep said ball, and therewith the lower section, *a'*, of the upright shaft of the basket *b*, with which said ball is integral from turning independently of said socket piece *d* and of the upper shaft section *a*. The lower shaft section *a'* is thus compelled to rotate with the upper shaft section, but is at the same time given a limited freedom of movement laterally; while the upper shaft section *a* and therewith the pulley *c* of the belt gearing is kept true by the rigid bearings 4 and 5 and their supports.

The freedom of movement of the lower shaft section *a'* and basket *b* is controlled by a heavy elastic disk, *e*, of rubber or other suitable material, fitted into the upper end of the ball socket *d'* of said socket piece *d* and having a central hole, and the ball *d''* is provided at top with a rigid pin or stud, 13, projecting into said hole and interacting with the elastic disk *e* to resist lateral movements of the lower shaft section and basket, and to induce or cause the same to run true.

The basket *b* is inclosed within the customary curb, *f*, the outlet of which is represented at *x*.

Apart from the overhanging devices above described, the improved centrifugal machine may be of any known or improved construction; the relative proportions of the ball *d''* and elastic disk *e* may of course vary; and other like modifications will suggest themselves to those skilled in the art.

Having thus described said improvement, I claim as my invention and desire to patent under this specification:

1. In an overhung centrifugal machine, the combination of a rotatable upright shaft composed of upper and lower sections, a rigid support for the upper shaft section including suitable rigid bearings therefor, means for rotating said shaft including a pulley fast on the upper shaft section, means for compelling the rotation of the lower shaft section therewith, and means carried by said shaft beneath said pulley for inducing the lower shaft section to run true when unevenly loaded.

2. In an overhung centrifugal machine, the combination of a rotatable upright shaft composed of upper and lower sections, a horizontal rigid support for the same, a pair of rigid bearings attached respectively to the top and bottom of said support and recessed to form a seat between the bearings proper, a pair of nuts on the shaft within such recess, a suitable washer interposed between the lowermost nut and said seat, means for rotating the shaft including a combined pulley and oil catcher fast on said upper shaft section beneath the lowermost rigid bearing, and means for coupling the shaft sections with each other and for compelling the lower section to rotate with the upper section and for inducing the lower shaft section to run true, including a socket coupled to the lower end of the upper shaft section, and mechanical devices within said socket piece.

3. In an overhung centrifugal machine, the combination of a rotatable upright shaft composed of upper and lower sections, means for rotating the upper shaft section, and means for compelling the rotation of the lower shaft section therewith including a socket piece rigidly coupled to the lower end of said upper shaft section, a ball within said socket piece integral with the upper end of the lower shaft section and provided at its top with a projection, and an elastic disk within said socket piece interacting with said projection to induce the lower shaft section to run true.

4. In an overhung centrifugal machine, the combination of a rotatable upright shaft composed of upper and lower sections, means for rotating the upper shaft section, means for compelling the rotation of the lower shaft section therewith including a socket piece rigidly coupled to the lower end of said upper shaft section and constructed with a central ball-socket and diametrically opposite holes, a ball within said socket piece integral with the upper end of the lower shaft section and provided with a normally horizontal pin fast within the ball and having projecting ends which interact with said holes said ball being further provided with a central projection at its top, and an elastic disk within said socket piece interacting with said projection to induce the lower shaft section to run true, substantially as hereinbefore specified.

JOHN M. CORNELL.

Witnesses:
W. S. FOWLER,
EDWIN MARSHALL.